(No Model.)
G. H. GILLETTE.
FRUIT BASKET.
No. 375,320. Patented Dec. 20, 1887.
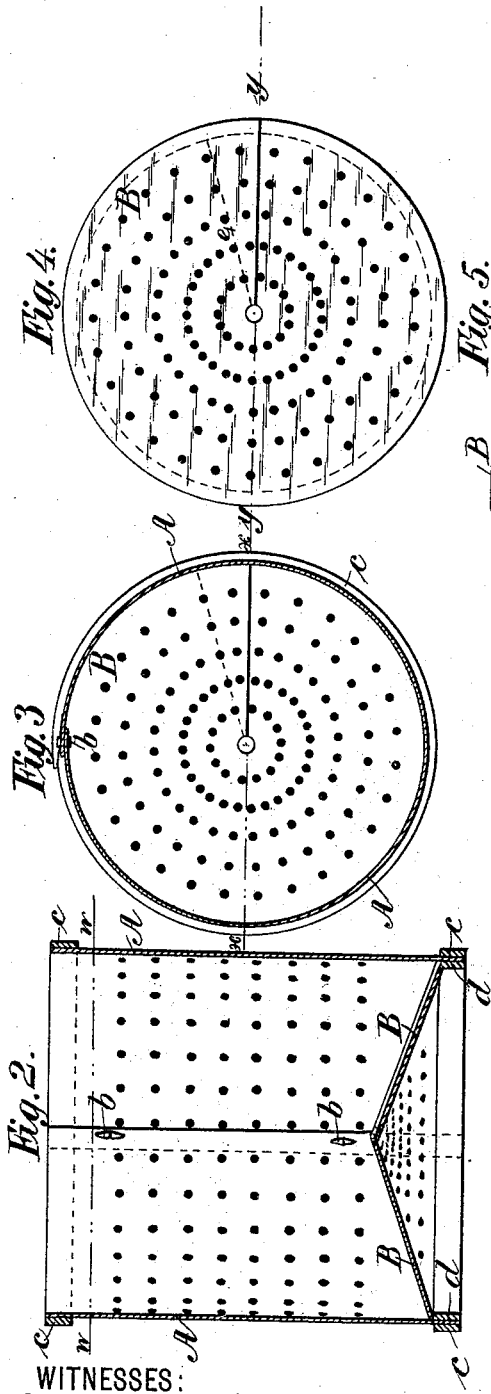
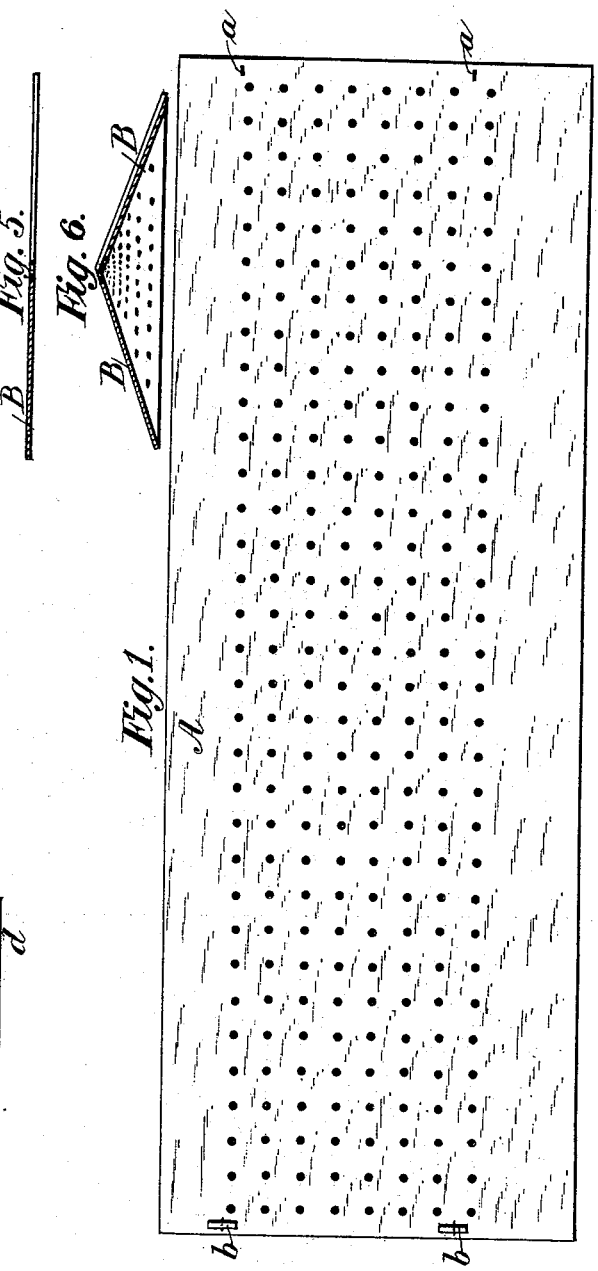
WITNESSES:
Edw. F. Tourtellotte.
William B. Bookstaver
INVENTOR
George H. Gillette
BY
Hubert H. Browning
ATTORNEY

UNITED STATES PATENT OFFICE.

GEORGE H. GILLETTE, OF NEW YORK, N. Y., ASSIGNOR TO THE NEWARK PAPER BASKET COMPANY, OF NEW JERSEY.

FRUIT-BASKET.

SPECIFICATION forming part of Letters Patent No. 375,320, dated December 20, 1887.

Application filed March 22, 1887. Serial No. 231,905. (No model.)

*To all whom it may concern:*

Be it known that I, GEORGE H. GILLETTE, a citizen of the United States, and a resident of the city of New York, in the county and State of New York, have invented certain new and useful Improvements in Fruit-Baskets, of which the following is such a full, clear, concise, and exact description as will enable others skilled in the art to which my invention appertains to make and use the same, reference being had to the accompanying drawings, forming part of this specification.

Heretofore baskets for the shipment of peaches and other fruit have been made of wood with openings between the strips, so as to permit the entrance of air; but the size of such openings, especially in large baskets, has at times widened by the springing of the strips of wood, and this has led to a loss of fruit by theft, and also during shipment or handling, besides which fruit contained in such baskets is frequently bruised and injured by persons who finger the same through the openings to ascertain its mellowness. Moreover there is great difficulty in furnishing wooden baskets, owing to the scarcity of timber from which to make them, and for this reason, as well as the costliness of such baskets, they have to be returned by the consumers to the dealers, who in turn send them back to the shippers. Aside from the inconvenience thus occasioned extra cost is added by the frequent payment of freight thus necessitated.

The object of my invention is to produce a fruit-basket which will be free from the objections attending the use of those heretofore made, and which will be cheap enough to be given to the consumer who purchases the fruit; and the invention consists in the construction of a paper basket, as hereinafter more fully described and claimed.

In the drawings, Figure 1 represents a sheet or strip of perforated paper adapted to form the body portion of the basket, while Fig. 2 is a vertical cross-section of a completed basket, the same being taken on the line $x\,x$ of Fig. 3. Fig. 3 is a transverse section of a completed basket, taken on the line $w\,w$ of Fig. 2. Fig. 4 represents the disk from which the bottom is formed; and Fig. 5 is a section of the same, taken on the line $y\,y$ of Fig. 4. Fig. 6 is a similar section of the completed bottom, but taken on the line $x\,x$ of Fig. 3.

In the drawings, A represents the body portion, and B the bottom, of the basket. The body and bottom are both preferably perforated, as shown, for the purpose of allowing free circulation of the air through the basket. The body A is made of a sheet of perforated paper, which, being cut the proper length, is provided with openings $a\,a$ at each end, and through these openings tin or metal fastenings $b\,b$ are passed and spread, as shown in Fig. 2, whereby the paper which forms the body is secured when rolled or bent in proper form. In Fig. 1 the fastenings $b\,b$ are shown as being inserted into the openings $a\,a$ while the sheet is flat, in which shape it may, if desired, be shipped to the growers, who can then complete it by releasing the clasp or fastening at such end, and by bringing the two ends together, and then inserting such fastenings through the other end and clinching them.

In completing the body portion I prefer to secure a hoop, $c$, around and outside of the body at both the top and bottom thereof, and secure another hoop, $d$, around and inside of the bottom of the body portion, upon which the bottom B sets. Such hoops may all be made of paper or not, as desired, and they may be secured to the body by nails or in any other suitable way.

The bottom B is cut or stamped from a sheet of paper, pasteboard, or other suitable material, circular or in disk form, such disk being about as large as the outside of the body when the hoop is added, and such bottom piece is slit from the center outwardly at some one part, cutting a radius, $e$, as it were, in the disk. In the center of this bottom piece I prefer to make a small hole, and when the same is slit from this hole outwardly, as shown by the radius $e$, the paper is then overlapped at the ends formed by the slit, and its diameter is reduced by compressing it until it reaches the size indicated by the dotted circle in Fig. 4, which is equal in diameter to the inside circumference of the body. This reduction in diameter brings the bottom into a cone shape, as shown in Figs. 2 and 6, and it may be secured in this form by fastenings; but I prefer simply to set it down in the body upon the hoop $d$, which will prevent it from coming out, while if free from fastenings its expansive force will tighten it against the inside of the body, and when fruit is placed thereon it will be perfectly secure.

In practice I prefer to use pasteboard, which I perforate by a suitable die, and make the entire basket of the same material, which I find to possess sufficient strength and to be of about the best weight; but other material might be used if made in the same general way. In using pasteboard I coat the same, after being perforated and cut, with some water-proof material which will not have any deleterious effect upon the fruit when placed in the basket.

The form of basket shown by the drawings is what may be termed "straight" or "cylindrical," which I think best for peaches, because less space will be wasted when such baskets containing fruit are packed into a car for shipment, and consequently a greater quantity of fruit would enter one car in baskets of this form than when a spreading form of basket is used; but so far as my invention is concerned the form is immaterial, inasmuch as different forms may be constructed in a similar manner. I may also add that the particular devices for fastening the parts together which are shown are not essential, as any other fastenings adapted to the purpose may be used with good results; but the fastenings shown I find to be convenient.

It will at once be understood that by using a perforated basket the fruit is kept free from injury by the fingering which is now so common where baskets of the ordinary construction are employed.

Having thus described my invention, what I claim as new, and desire to secure by Letters Patent, is—

1. A fruit-basket comprising a body, a hoop on the inside of and near the lower end of the body, and an unattached elastic bottom resting on the hoop, said bottom being contracted within the body, whereby it is rendered inherently expansible and pressing against the body, as and for the purpose set forth.

2. In a fruit-basket having a perforated body, A, and hoop $d$, an elastic bottom consisting of a disk slitted and overlapped, whereby said bottom is expanded against the body, as and for the purpose set forth.

GEORGE H. GILLETTE.

Witnesses:
WILLIAM B. BOOKSTAVER,
HUBERT A. BANNING.